US011001212B2

(12) United States Patent
Wang

(10) Patent No.: US 11,001,212 B2
(45) Date of Patent: May 11, 2021

(54) CAR JUMP START POWER SOURCE

(71) Applicant: Yuhua Wang, Beijing (CN)

(72) Inventor: Yuhua Wang, Beijing (CN)

( * ) Notice: Subject to any disclaimer, the term of this patent is extended or adjusted under 35 U.S.C. 154(b) by 0 days.

(21) Appl. No.: 16/765,718

(22) PCT Filed: Nov. 21, 2018

(86) PCT No.: PCT/CN2018/116745
§ 371 (c)(1),
(2) Date: May 20, 2020

(87) PCT Pub. No.: WO2019/101108
PCT Pub. Date: May 31, 2019

(65) Prior Publication Data
US 2020/0290535 A1    Sep. 17, 2020

(30) Foreign Application Priority Data

Nov. 22, 2017    (CN) .......................... 201721565395.5

(51) Int. Cl.
*F02N 11/08*    (2006.01)
*B60R 16/03*    (2006.01)

(52) U.S. Cl.
CPC ...... *B60R 16/0307* (2013.01); *F02N 11/0862* (2013.01)

(58) Field of Classification Search
CPC .. B60R 16/0307; F02N 11/0862; F02N 11/14; F02N 11/12; H02J 2310/46; H02J 2310/22; H02J 7/0048; H02J 1/122
See application file for complete search history.

(56) References Cited

U.S. PATENT DOCUMENTS 1,475,630 A * 11/1923 Herz .................... H05B 1/0205
                                                        219/439
9,506,446 B2 * 11/2016 Xinfang .................. B60L 53/14
                        (Continued)

FOREIGN PATENT DOCUMENTS

CN    204304481    4/2015
CN    205195375    4/2016
                (Continued)

OTHER PUBLICATIONS

Wikipedia contributors. "Condenser (optics)." Wikipedia, The Free Encyclopedia. Wikipedia, The Free Encyclopedia, Feb. 3, 2021. Web. Mar. 18, 2021. (Year: 2021).*

(Continued)

*Primary Examiner* — Daniel Cavallari
(74) *Attorney, Agent, or Firm* — Renner, Otto, Boisseile & Sklar, LLP

(57) ABSTRACT

A car jump start power source comprises a casing assembly having an accommodating chamber as well as a press key, an optical condenser, a light guide bar, an electrical device assembly and a battery pack provided in the accommodating chamber; the casing assembly comprising a top casing, a bottom casing, a rubber cover covering a three-hole socket, a top aluminum casing and a bottom aluminum casing; and the top casing being mounted on the bottom casing in a non-detachable manner, and the accommodating chamber being collectively surround by the top casing and the bottom casing. One first mounting hole is provided in a top of the bottom casing, and the rubber cover is mounted at the first mounting hole. A separation plate is provided on the bottom casing, and the separation plate separates the accommodating chamber into a front chamber in which the press key, the optical condenser, the light guide bar and the electrical device assembly are mounted and a rear chamber in which the battery pack is mounted. Power from the battery pack is (Continued)

led out via a three-hole socket to an electric accumulator of a motorcar through an intelligent cable for a jump start.

7 Claims, 6 Drawing Sheets

(56) References Cited

U.S. PATENT DOCUMENTS

| | | | |
|---|---|---|---|
| 10,826,266 B2* | 11/2020 | Liu | .................... H01S 5/02476 |
| 2016/0301229 A1 | 10/2016 | Chao et al. | |
| 2016/0308379 A1* | 10/2016 | Pan | ......................... F02N 11/00 |

FOREIGN PATENT DOCUMENTS

| | | |
|---|---|---|
| CN | 106532797 | 3/2017 |
| CN | 207530573 | 6/2018 |
| JP | 2009262856 | 11/2009 |

OTHER PUBLICATIONS

International Search Report and Written Opinion for corresponding patent application No. PCT/CN2018/116745 dated Jan. 23, 2019.

* cited by examiner

US 11,001,212 B2

CAR JUMP START POWER SOURCE

RELATED APPLICATIONS

This application claims priority to International Patent Application No. PCT/CN2018/116745 filed on Nov. 21, 2018, which claims benefit of Chinese Patent Application No. 201721565395.5 filed on Nov. 22, 2017, which is hereby incorporated herein by reference.

TECHNICAL FIELD

The present disclosure relates to a technical field of a mobile power source that is dischargeable in a heavy current, in particular to a car jump start power source.

BACKGROUND ART

A car jump start power source is an apparatus that supplies start electrical energy to an engine of a motorcar in a case where an electric accumulator of the motorcar is short of electricity. The car jump start power source available in the current market is large in volume, complicated in machining, high in cost, and a press key and a spotlight attached thereof are desired to be improved.

SUMMARY

In view of the above defects in the prior art, the present disclosure aims to achieve an object of providing a car jump start power source that supplies start electrical energy to the engine of the motorcar in a case where the electric accumulator of the motorcar is short of electricity, that is also capable of charging 5V mobile electronic products and is attached with a focusing spotlight, in which four capacity indicators are arranged in a row, and that has a rational compact inner structure, exhibits a reduced cost in machining and assembling, and is improved in product quality.

The present disclosure provides a car jump start power source with a technical solution residing in that it comprises a casing assembly having an accommodating chamber as well as a press key, an optical condenser, a light guide bar, an electrical device assembly and a battery pack provided in the accommodating chamber, the casing assembly comprising a top casing, a bottom casing, a rubber cover, a top aluminum casing and a bottom aluminum casing, the top casing being mounted on the bottom casing in a non-detachable manner, and the accommodating chamber being collectively surrounded by the top casing and the bottom casing;

wherein one first mounting hole is provided in a top of the bottom casing, and the rubber cover is mounted at the first mounting hole, and wherein a separation plate is provided on the bottom casing, and the separation plate separates the accommodating chamber into a front chamber in which the press key, the optical condenser, the light guide bar and the electrical device assembly are mounted and a rear chamber in which the battery pack is mounted.

Preferably, the casing assembly comprises a top casing assembly and a bottom casing assembly, the top casing assembly having the top aluminum casing, a double-sided adhesive sheet, the top casing and the light guide bar; the top aluminum casing is bonded and fixed to the top casing via the double-sided adhesive sheet; the light guide bar is composed of four light guide columns arranged in a row and connected integrally and provided with a mounting piece configured to fix the light guide bar, four light guide bar mounting holes are provided in the mounting piece, and light guide bar fixing posts configured to mate with the light guide bar mounting holes are provided in the front chamber of the top casing; and four light guide bar mounting holes are opened in the top casing, one end of the light guide bar protrudes out of the light guide bar mounting holes of the top casing, and the light guide bar is fixedly mounted in the top casing via the light guide bar fixing posts.

Preferably, the casing assembly comprises a top casing assembly and a bottom casing assembly, the bottom casing assembly having the bottom aluminum casing, a double-sided adhesive sheet, the bottom casing, the press key and the rubber cover; the bottom aluminum casing is bonded and fixed to the bottom casing via the double-sided adhesive sheet; an elastic hook tab for fixation is provided on the press key; a fixing hook configured to mate with a mounting hole of the press key is provided in the front chamber of the bottom casing, and the press key is fixedly mounted in the bottom casing by the fixing hook; and an elongate back catch for fixation is provided on the rubber cover, and an oblong hole configured to mate with the rubber cover is provided in the front chamber of the bottom casing.

Preferably, the electrical device assembly comprises a circuit board as well as a USB port, a power switch, a spotlight and an LED indicator fixed to the circuit board; the circuit board, the USB port, the power switch, the spotlight and the LED indicator are mounted in the front chamber; and a USB port mounting hole located at a position corresponding to the USB port and an optical condenser mounting hole located at a position corresponding to the spotlight are opened in an end face of the front chamber of the bottom casing.

Preferably, the optical condenser is provided between the spotlight and the optical condenser mounting hole.

Preferably, convex ribs are provided on both end edges of the top casing, and concave slots configured to mate with the convex ribs of the top casing are provided on both end edges of the bottom casing; and rabbet convex ribs are provided on both side edges of the bottom casing, and concave slots configured to mate with the rabbet convex ribs of the bottom casing are provided on both side edges of the top casing.

Preferably, at least four projections are provided on each of both side edges of the bottom casing, and recesses configured to mate with the projections are provided on both side edges of the top casing.

Wherein:
100: car jump start power source;
1: top casing assembly;
11: top aluminum casing;
12, 43: double-sided adhesive sheet;
13: top casing;
14: light guide bar;
2: screw;
3: electrical device assembly;
4: battery pack;
41: soft plastic pad;
42: storage battery;
5: press key;
6: optical condenser;
7: rubber cover;
8: bottom casing assembly;
81: bottom casing;
82: bottom aluminum casing;
111: top casing recess;
112: light guide bar fixing post;
141: light guide bar mounting hole;
31: circuit board;
32: battery capacity LED indicator;
33: micro USB port;
34: power switch;
35: USB port;
36: battery wire socket;
37: spotlight;
422: battery wire plug;
421: three-hole socket;
816: three-hole socket port;
815: first mounting hole;
814: press key hole;
813: micro USB port mounting hole;
812: USB port mounting hole;
811: optical condenser mounting hole;
817: bottom casing projection.

DETAILED DESCRIPTION OF THE SPECIFIC EMBODIMENTS

The present disclosure will be described further below in connection with the accompanying drawings and the specific embodiments.

Figure 1:
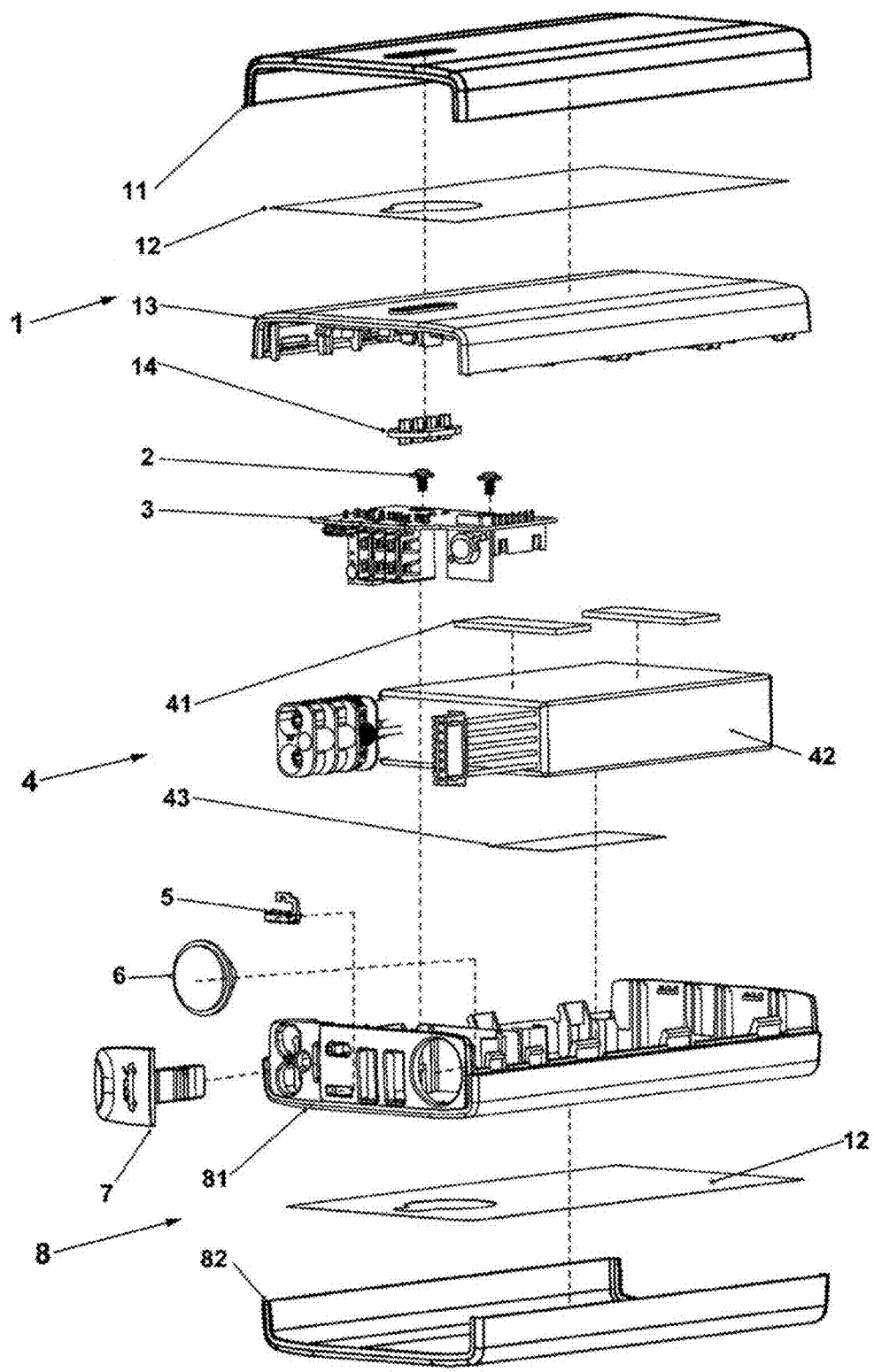
FIG. 1 is an exploded schematic diagram of a car jump start power source of a preferred embodiment of the present disclosure.
Figure 2:
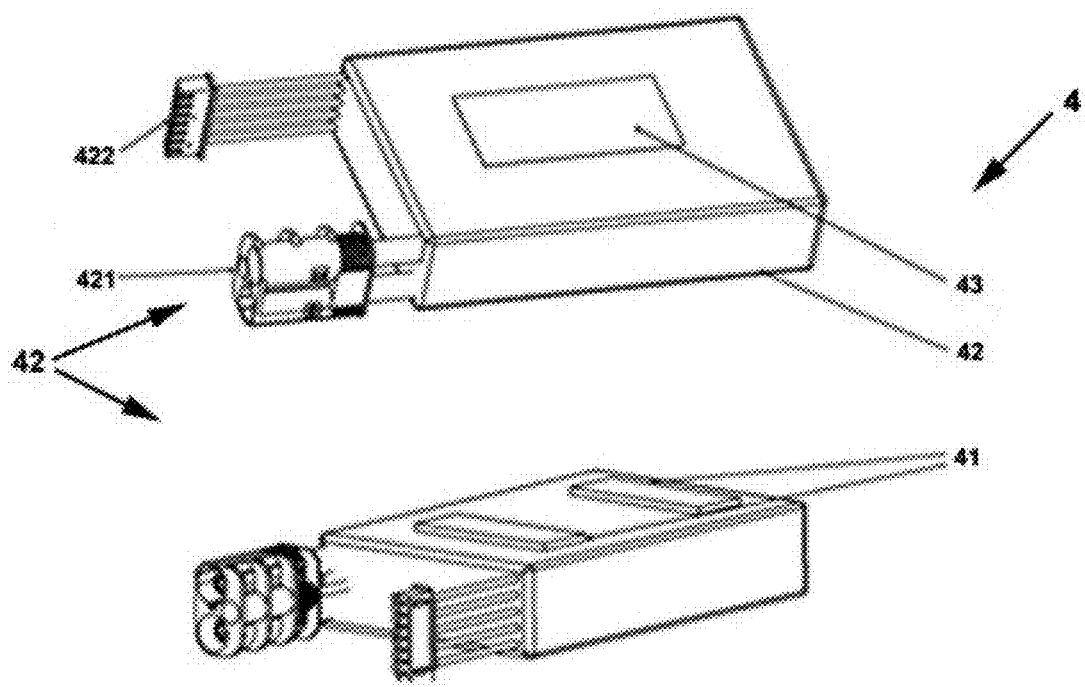
FIG. 2 is a structural schematic diagram of a battery pack of the preferred embodiment of the present disclosure.
Figure 3:
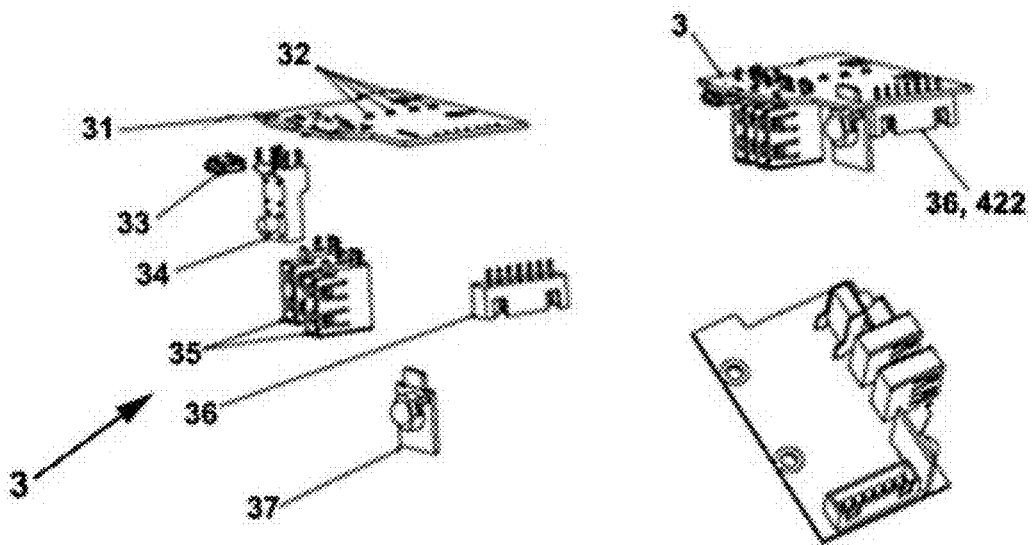
FIG. 3 is an exploded schematic diagram of an electrical device assembly of the preferred embodiment of the present disclosure.
Figure 4:
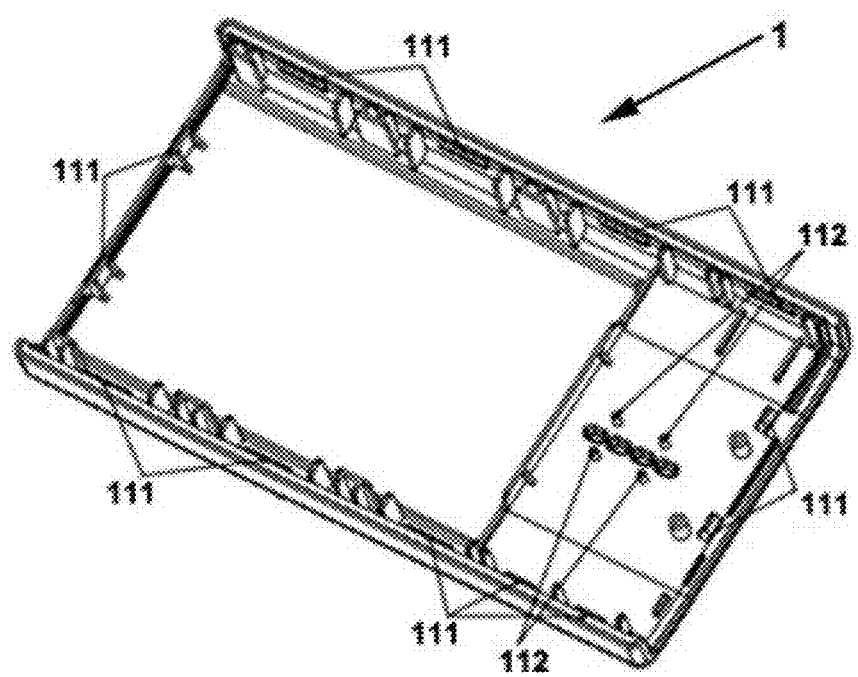
FIG. 4 is a structural schematic diagram showing a partially assembled state of a top casing assembly of the preferred embodiment of the present disclosure.
Figure 5:
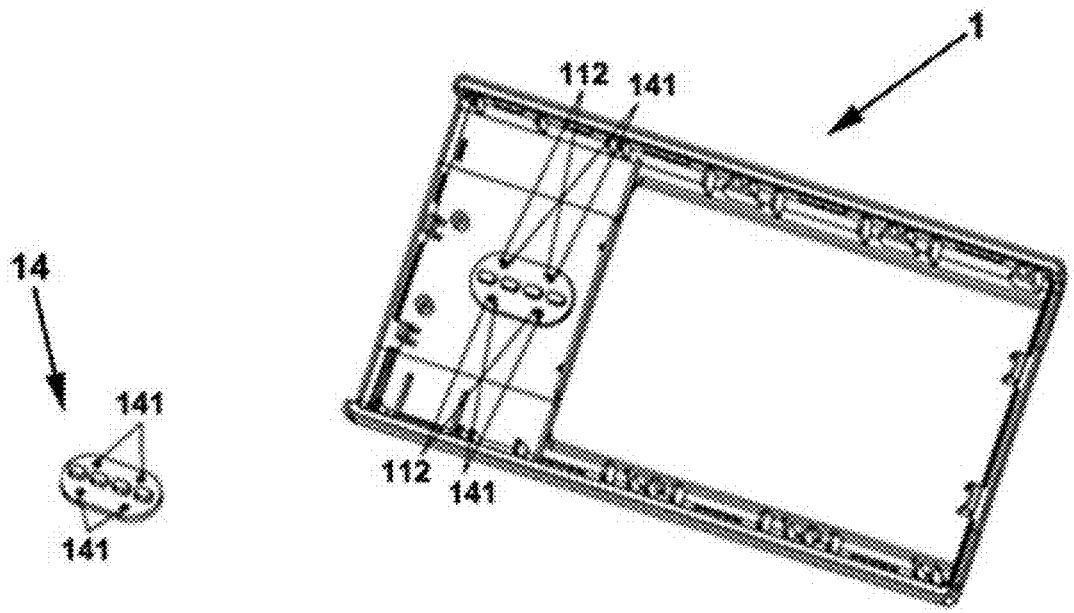
FIG. 5 is a structural schematic diagram showing an assembled state of a light guide bar of the preferred embodiment of the present disclosure.
Figure 6:
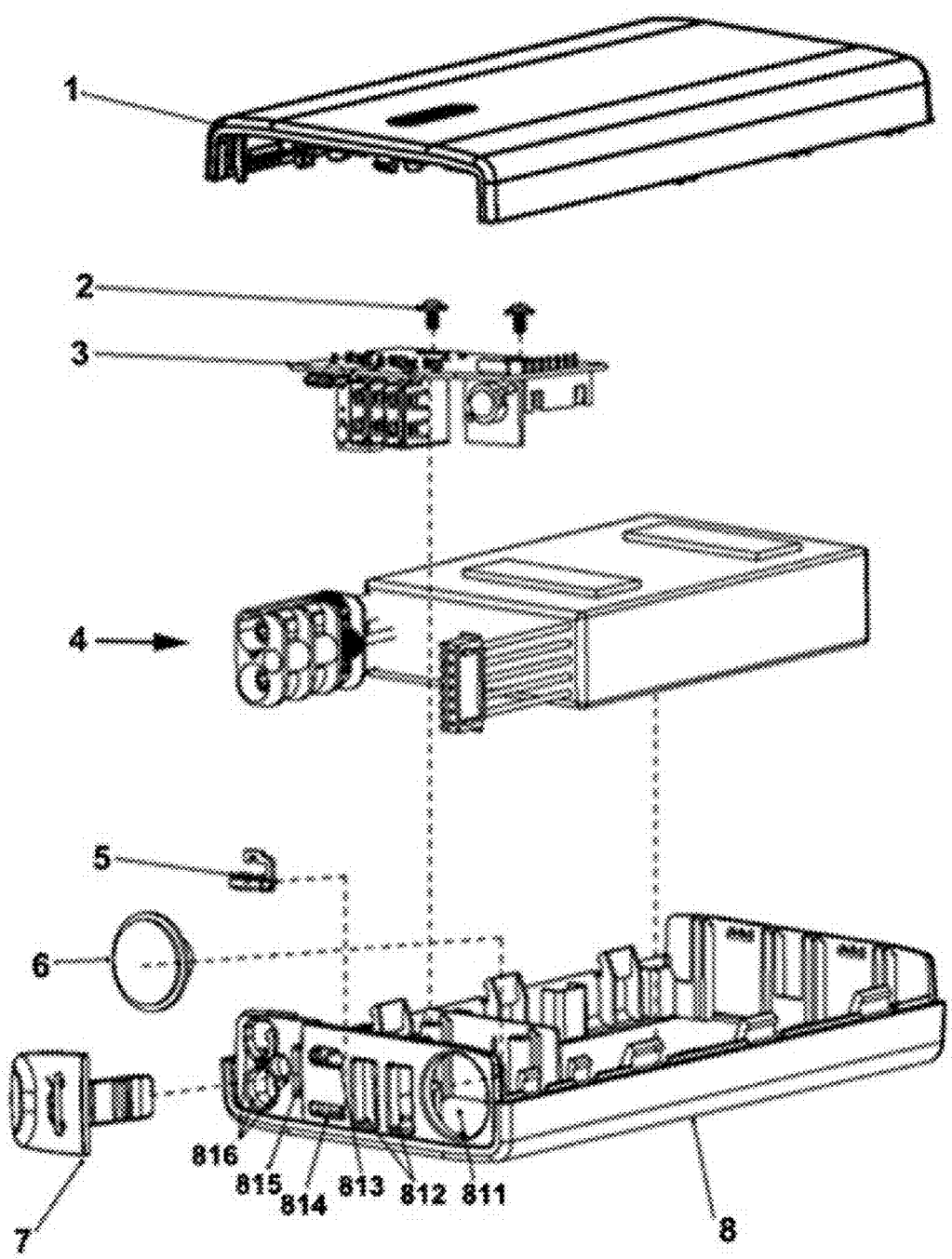
FIG. 6 is an exploded schematic diagram of a casing assembly of the preferred embodiment of the present disclosure.
Figure 7:
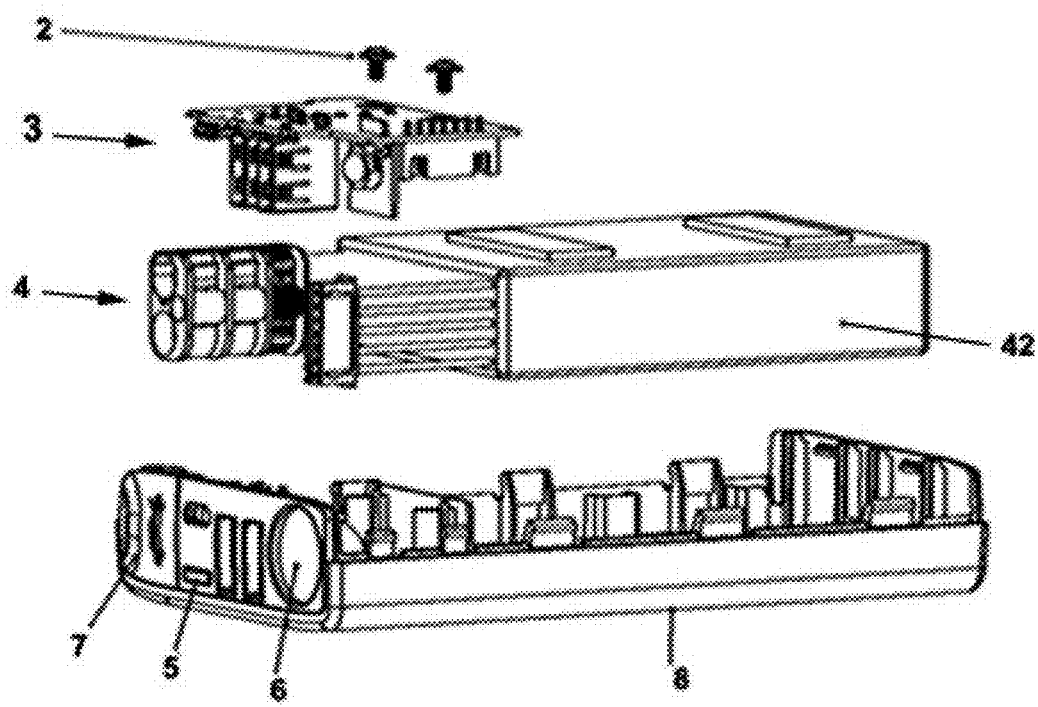
FIG. 7 is an exploded schematic diagram of the electrical device assembly and the battery pack of the preferred embodiment of the present disclosure.
Figure 8:
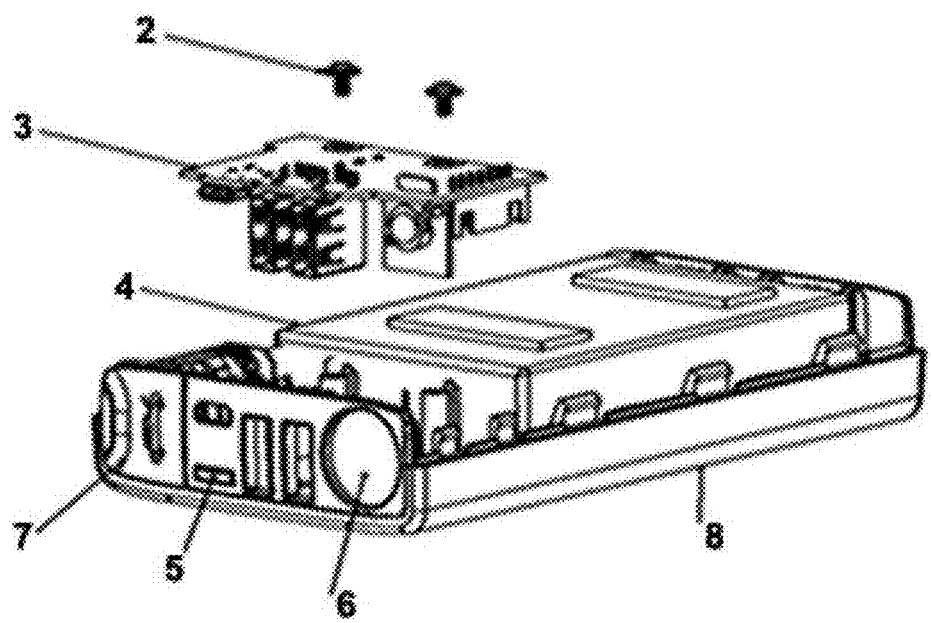
FIG. 8 is a schematic diagram showing an assembled or exploded state of the electrical device assembly of the preferred embodiment of the present disclosure.
Figure 9:
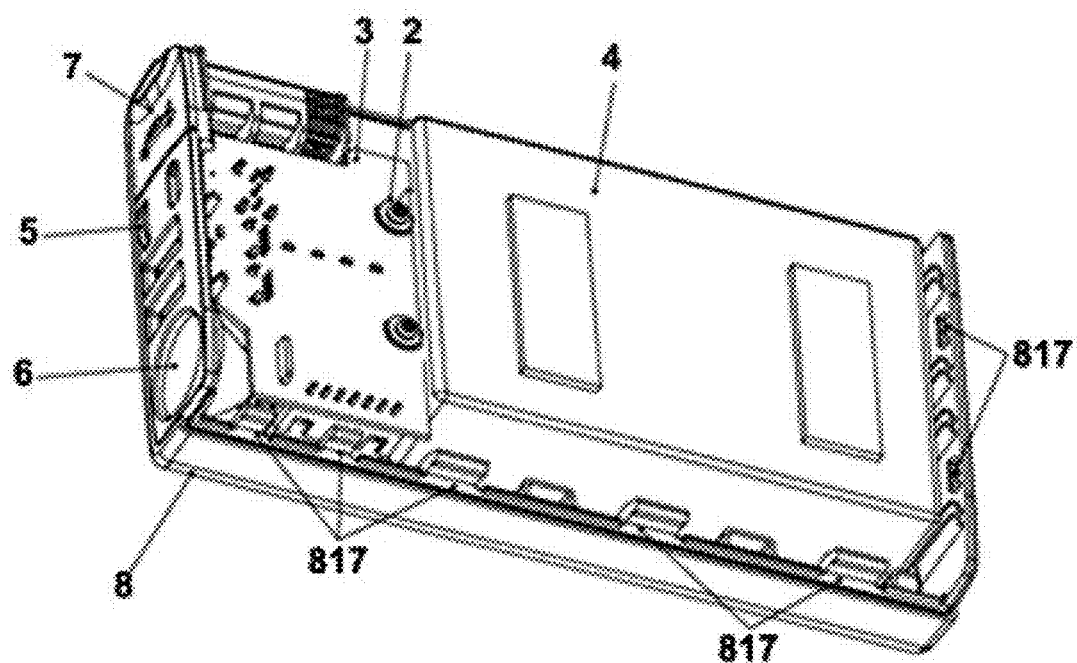
FIG. 9 is a structural schematic diagram showing an assembled state of the battery pack, the electrical device assembly and an optical condenser of the preferred embodiment of the present disclosure.
Figure 10:
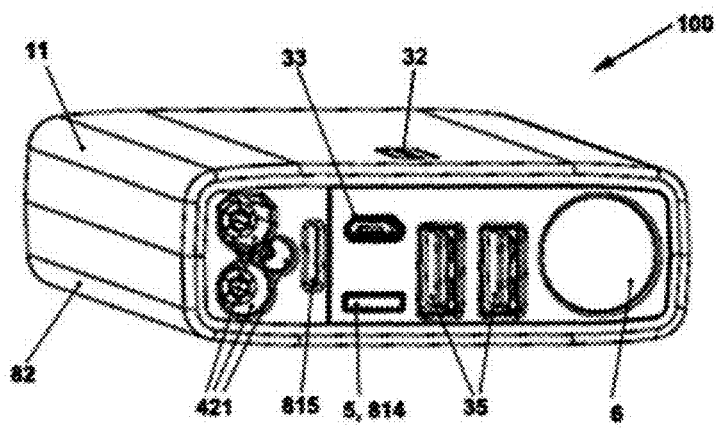
FIG. 10 is a schematic diagram showing an overall appearance of the car jump start power source in the preferred embodiment of the present disclosure.

As shown in FIGS. 1-10, a car jump start power source 100 includes a casing assembly having an accommodating chamber as well as a press key 5 configured to turn on and off a spotlight, an optical condenser 6 configured to condense light of the spotlight, a light guide bar 14, an electrical device assembly 3 and a battery pack 4 provided in the accommodating chamber; wherein the casing assembly includes a top casing 13, a bottom casing 81, a rubber cover 7, a top aluminum casing 11 and a bottom aluminum casing 82; wherein the top casing 13 is mounted on the bottom casing 81 in a non-detachable manner, and the accommodating chamber is collectively surrounded by the top casing 13 and the bottom casing 81; wherein one first mounting hole 815 is provided in a top of the bottom casing 81, and the rubber cover 7 is mounted at the first mounting hole 815, that is, the rubber cover 7 is mounted with an elongate back catch of the rubber cover 7 inserted into the first mounting hole 815; and wherein a separation plate is provided on the bottom casing 81, and the separation plate separates the accommodating chamber into a front chamber in which the press key 5, the optical condenser 6, the light guide bar 14 and the electrical device assembly 3 are mounted and a rear chamber in which the battery pack 4 is mounted, as shown in FIGS. 1 and 6. The rubber cover 7 is preferably made of a heat-resistant silicone rubber.

In an embodiment, as shown in FIGS. 1, 4 and 5, the casing assembly comprises a top casing assembly 1 and a bottom casing assembly 8, wherein the top casing assembly 1 includes the top aluminum casing 11, a double-sided adhesive sheet 12, the top casing 13 and the light guide bar 14; wherein the top aluminum casing 11 is bonded and fixed to the top casing 13 via the double-sided adhesive sheet 12; wherein the light guide bar 14 is composed of four light guide columns arranged in a row and connected integrally and provided with a mounting piece configured to fix the light guide bar, four light guide bar mounting holes 141 are provided in the mounting piece, and light guide bar fixing posts 112 configured to mate with the light guide bar mounting holes of the light guide bar 14 are provided in the front chamber of the top casing 13; and wherein four light guide bar mounting holes are opened in the top casing 13, one end of the light guide bar protrudes out of the light guide bar mounting holes of the top casing, and the light guide bar is fixedly mounted in the top casing 13 via the light guide bar fixing posts 112 by fusion welding.

In an embodiment, as shown in FIGS. 1 and 6, the casing assembly comprises a top casing assembly 1 and a bottom casing assembly 8, wherein the bottom casing assembly 8 includes the bottom aluminum casing 82, a double-sided adhesive sheet 12, the bottom casing 81, the press key 5 and the rubber cover 7; wherein the bottom aluminum casing 82 is bonded and fixed to the bottom casing 81 via the double-sided adhesive sheet 12; wherein an elastic hook tab for fixation is provided on the press key 5; wherein a fixing hook configured to mate with a press key mounting hole 814 is provided in the front chamber of the bottom casing, and the press key is fixedly mounted in the bottom casing 81 by the fixing hook; wherein the press key 5 and a power switch 34 provided on a circuit board 31 are operated in an interlinked manner, including operating an attached spotlight; and wherein an elongate back catch for fixation is provided on the rubber cover 7, and an oblong mounting hole 815 configured to mate with the rubber cover 7 is provided in the front chamber of the bottom casing 81 (the rubber cover 7 is fixed with the elongate back catch inserted into the oblong hole 815).

The battery pack 4 has a storage battery 42, a three-hole socket 421 and a three-hole socket port 816. The three-hole socket is to be inserted by a dedicated three-pin EC5 plug (not shown) connected to a cable conductor (not shown) for jump-starting a motorcar and equipped with an intelligent protection device, and the cable conductor is connected to an electric accumulator of the motorcar via an electric clip for use. When it is not in use, the three-hole socket 421 and the three-hole socket port 816 are covered by the rubber cover 7 to prevent short circuit and guarantee safety.

As shown in FIGS. 1-9, the electrical device assembly 3 includes the circuit board 31 having a micro USB port 33, a USB port 35, the power switch 34, a spotlight 37 and an LED indicator 32 fixed to the circuit board 31; wherein the circuit board 31, the micro USB port 33, the USB port 35, the power switch 34, the spotlight 37 and the LED indicator 32 are mounted in the front chamber; wherein a micro USB mounting hole 813 located at a position corresponding to the micro USB port 33, a USB mounting hole 812 located at a position corresponding to the USB port 35, and an optical condenser mounting hole 811 located at a position corresponding to the spotlight 37 are opened in an end face of the front chamber of the bottom casing 81; wherein the optical condenser 6 is provided between the spotlight 37 and the optical condenser mounting hole 811; wherein the circuit board 31 is fixed to threaded cylinders in the front chamber of the bottom casing 81 via screws 2; wherein the optical condenser is placed in the optical condenser mounting hole 811 of the bottom casing; and wherein the battery pack is mounted in the rear chamber of the bottom casing 81 via the double-sided adhesive sheet. The micro USB port 33 is intended to charge the storage battery 42, and the USB port 35 is intended to supply power to other electronic devices.

As shown in FIGS. 4-9, convex ribs are provided on both end edges of the top casing 13, and concave slots configured to mate with the convex ribs of the top casing 13 are provided on both end edges of the bottom casing 81; and rabbet convex ribs are provided on both side edges of the bottom casing 81, and concave slots configured to mate with the rabbet convex ribs of the bottom casing 81 are provided on both side edges of the top casing 13.

As shown in FIGS. 4-9, at least four projections 817 is provided on each of both side edges of the bottom casing 81, and recesses 111 configured to mate with the projections 817 are provided on both side edges of the top casing 13; wherein the recesses of the top casing are snap-fitted with the projections provided on the bottom casing.

Various modifications and variations can be made for a person skilled in the art based on the technical solutions and concepts described above. All of these modifications and variations should be regarded as falling within protection scopes of the claims of the present disclosure.

What is claimed is:

1. A car jump start power source, characterized in that it comprises a casing assembly having an accommodating chamber as well as a press key, an optical condenser, a light guide bar, an electrical device assembly and a battery pack provided in the accommodating chamber, the casing assembly comprising a top casing, a bottom casing, a rubber cover, a top aluminum casing and a bottom aluminum casing, the top casing being mounted on the bottom casing in a non-detachable manner, and the accommodating chamber being collectively surrounded by the top casing and the bottom casing;

wherein one first mounting hole is provided in a top of the bottom casing, and the rubber cover is mounted at the first mounting hole, and wherein a separation plate is provided on the bottom casing, and the separation plate separates the accommodating chamber into a front chamber in which the press key, the optical condenser, the light guide bar and the electrical device assembly are mounted and a rear chamber in which the battery pack is mounted.

2. The car jump start power source of claim 1, wherein the casing assembly comprises a top casing assembly and a bottom casing assembly, the top casing assembly having the top aluminum casing, a double-sided adhesive sheet, the top casing and the light guide bar; wherein the top aluminum casing is bonded and fixed to the top casing via the double-sided adhesive sheet; wherein the light guide bar is composed of four light guide columns arranged in a row and connected integrally and provided with a mounting piece configured to fix the light guide bar, four light guide bar mounting holes are provided in the mounting piece, and light guide bar fixing posts configured to mate with the light guide bar mounting holes are provided in the front chamber of the top casing; and wherein four light guide bar mounting holes are opened in the top casing, one end of the light guide bar protrudes out of the light guide bar mounting holes of the top casing, and the light guide bar is fixedly mounted in the top casing via the light guide bar fixing posts.

3. The car jump start power source of claim 1, wherein the casing assembly comprises a top casing assembly and a bottom casing assembly, the bottom casing assembly having the bottom aluminum casing, a double-sided adhesive sheet, the bottom casing, the press key and the rubber cover; wherein the bottom aluminum casing is bonded and fixed to the bottom casing via the double-sided adhesive sheet; wherein an elastic hook tab for fixation is provided on the press key; wherein a fixing hook configured to mate with a mounting hole of the press key is provided in the front chamber of the bottom casing, and the press key is fixedly mounted in the bottom casing by the fixing hook; and wherein an elongate back catch for fixation is provided on the rubber cover, and an oblong hole configured to mate with the rubber cover is provided in the front chamber of the bottom casing.

4. The car jump start power source of claim 1, wherein the electrical device assembly comprises a circuit board as well as a USB port, a power switch, a spotlight and an LED indicator fixed to the circuit board; wherein the circuit board, the USB port, the power switch, the spotlight and the LED indicator are mounted in the front chamber; and wherein a USB port mounting hole located at a position corresponding to the USB port and an optical condenser mounting hole located at a position corresponding to the spotlight are opened in an end face of the front chamber of the bottom casing.

5. The car jump start power source of claim 4, wherein the optical condenser is provided between the spotlight and the optical condenser mounting hole.

6. The car jump start power source of claim 1, wherein convex ribs are provided on both end edges of the top casing, and concave slots configured to mate with the convex ribs of the top casing are provided on both end edges of the bottom casing; and wherein rabbet convex ribs are provided on both side edges of the bottom casing, and concave slots configured to mate with the rabbet convex ribs of the bottom casing are provided on both side edges of the top casing.

7. The car jump start power source of claim 1, wherein at least four projections are provided on each of both side edges of the bottom casing, and recesses configured to mate with the projections are provided on both side edges of the top casing.

* * * * *